United States Patent
Won et al.

(10) Patent No.: US 7,797,362 B2
(45) Date of Patent: Sep. 14, 2010

(54) PARALLEL ARCHITECTURE FOR MATRIX TRANSPOSITION

(75) Inventors: Nara Won, Allen, TX (US); Ching-Yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 874 days.

(21) Appl. No.: 11/678,130

(22) Filed: Feb. 23, 2007

(65) Prior Publication Data

US 2008/0208942 A1     Aug. 28, 2008

(51) Int. Cl.
*G06F 7/78*     (2006.01)
(52) U.S. Cl. ........................................ 708/400
(58) Field of Classification Search ............. None
See application file for complete search history.

(56) References Cited

U.S. PATENT DOCUMENTS

| | | | |
|---|---|---|---|
| 4,959,776 A | 9/1990 | Deerfield et al. | |
| 5,193,203 A * | 3/1993 | Artieri | 712/300 |
| 6,295,546 B1 | 9/2001 | Adiletta | |
| 6,505,288 B1 | 1/2003 | Jang et al. | |
| 6,877,020 B1 * | 4/2005 | Bratt et al. | 708/400 |
| 7,031,994 B2 * | 4/2006 | Lao et al. | 708/400 |
| 2002/0114206 A1 | 8/2002 | Honigschmid et al. | |
| 2006/0161607 A1 | 7/2006 | Gustavson et al. | |
| 2006/0190517 A1 * | 8/2006 | Guerrero | 708/514 |
| 2009/0300310 A1 * | 12/2009 | Van Berkel | 711/165 |

* cited by examiner

*Primary Examiner*—David H Malzahn
(74) *Attorney, Agent, or Firm*—Robert D. Marshall, Jr.; W. James Brady; Frederick J. Telecky, Jr.

(57) ABSTRACT

An extension to current multiple memory bank video processing architecture is presented. A more powerful memory controller is incorporated, allowing computation of multiple memory addresses at both the input and the output data paths making possible new combinations of reads and writes at the input and output ports. Matrix transposition computations required by the algorithms used in image and video processing are implemented in MAC modules and memory banks. The technique described here can be applied to other parallel processors including future VLIW DSP processors.

7 Claims, 7 Drawing Sheets

*FIG. 2*
(PRIOR ART)

MEMORY ADDRESSING FOR INPUT MATRIX A (A)

| a | b | c | d | e | f | g | h |
|---|---|---|---|---|---|---|---|
| j | k | m | n | p | q | r | s |
| t | u | v | w | y | z | A | B |
| C | D | E | F | G | H | J | K |
| M | N | P | Q | R | S | T | U |
| V | W | Y | Z | A1 | A2 | A3 | A4 |

◄— INPUT OFFSET = 8 —►

MEMORY ADDRESSING FOR OUTPUT MATRIX B (B)

| a | j | t | C | M | V | 00 |
|---|---|---|---|---|---|---|
| b | k | u | D | N | W | 00 |
| c | m | v | E | P | Y | 00 |
| d | n | w | F | Q | Z | 00 |
| e | p | y | G | R | A1 | 00 |
| f | q | z | H | S | A2 | 00 |
| g | r | A | J | T | A3 | 00 |
| h | s | B | K | U | A4 | 00 |

◄— OUTPUT OFFSET = 7 —►

(C)

| $d_{in}[0:3]\rightarrow$ | a | b | c | d |
|---|---|---|---|---|
| $d_{in}[4:7]\rightarrow$ | e | f | g | h |
| $d_{in}[8:11]\rightarrow$ | j | k | m | n |
| $d_{in}[12:15]\rightarrow$ | p | q | r | s |
| $d_{in}[16:19]\rightarrow$ | t | u | v | w |
| $d_{in}[20:23]\rightarrow$ | y | z | A | B |
| $d_{in}[24:27]\rightarrow$ | C | D | E | F |
| $d_{in}[28:31]\rightarrow$ | G | H | J | K |
| $d_{in}[32:35]\rightarrow$ | M | N | P | Q |
| $d_{in}[36:39]\rightarrow$ | R | S | T | U |
| $d_{in}[40:43]\rightarrow$ | V | W | Y | Z |
| $d_{in}[44:47]\rightarrow$ | A1 | A2 | A3 | A4 |

(D)

| $d_{out}[0:3]\rightarrow$ | a | j | t | c |
|---|---|---|---|---|
| $d_{out}[4:7]\rightarrow$ | M | V | 00 | b |
| $d_{out}[8:11]\rightarrow$ | k | u | D | N |
| $d_{out}[12:15]\rightarrow$ | W | 00 | c | m |
| $d_{out}[16:19]\rightarrow$ | v | E | P | Y |
| $d_{out}[20:23]\rightarrow$ | 00 | d | n | w |
| $d_{out}[24:27]\rightarrow$ | F | Q | Z | 00 |
| $d_{out}[28:31]\rightarrow$ | e | p | y | G |
| $d_{out}[32:35]\rightarrow$ | R | A1 | 00 | f |
| $d_{out}[36:39]\rightarrow$ | q | z | H | S |
| $d_{out}[40:43]\rightarrow$ | A2 | 00 | g | r |
| $d_{out}[44:47]\rightarrow$ | A | J | T | A3 |
| $d_{out}[48:51]\rightarrow$ | 00 | h | s | B |
| $d_{out}[52:55]\rightarrow$ | K | U | A4 | 00 |

*FIG. 4*

MEMORY ADDRESSING FOR INPUT MATRIX A

MEMORY ADDRESSING FOR OUTPUT MATRIX B (A)

| a | b | c | d | e | f | g |
|---|---|---|---|---|---|---|
| h | j | k | m | n | p | q |
| r | s | t | u | v | w | y |
| z | A | B | C | D | E | F |
| G | H | J | K | M | N | P |
| Q | R | S | T | U | V | W |

←── INPUT OFFSET = 7 ──→

(B)

| a | h | r | z | G | Q | 00 | 00 |
|---|---|---|---|---|---|----|----|
| b | j | s | A | H | R | 00 | 00 |
| c | k | t | B | J | S | 00 | 00 |
| d | m | u | C | K | T | 00 | 00 |
| e | n | v | D | M | U | 00 | 00 |
| f | p | w | E | N | V | 00 | 00 |
| g | q | y | F | P | W | 00 | 00 |

←── OUTPUT OFFSET = 8 ──→

(C)

| $d_{in}[0:3]\rightarrow$ | a | b | c | d |
|---|---|---|---|---|
| $d_{in}[4:7]\rightarrow$ | e | f | g | h |
| $d_{in}[8:11]\rightarrow$ | j | k | m | n |
| $d_{in}[12:15]\rightarrow$ | p | q | r | s |
| $d_{in}[16:19]\rightarrow$ | t | u | v | w |
| $d_{in}[20:23]\rightarrow$ | y | z | A | B |
| $d_{in}[24:27]\rightarrow$ | C | D | E | F |
| $d_{in}[28:31]\rightarrow$ | G | H | J | K |
| $d_{in}[32:35]\rightarrow$ | M | N | P | Q |
| $d_{in}[36:39]\rightarrow$ | R | S | T | U |
| $d_{in}[40:43]\rightarrow$ | V | W |   |   |

(D)

| $d_{out}[0:3]\rightarrow$ | a | h | r | z |
|---|---|---|---|---|
| $d_{out}[4:7]\rightarrow$ | G | Q | 00 | 00 |
| $d_{out}[8:11]\rightarrow$ | b | j | s | A |
| $d_{out}[12:15]\rightarrow$ | H | R | 00 | 00 |
| $d_{out}[16:19]\rightarrow$ | c | k | t | B |
| $d_{out}[20:23]\rightarrow$ | J | S | 00 | 00 |
| $d_{out}[24:27]\rightarrow$ | d | m | u | C |
| $d_{out}[28:31]\rightarrow$ | K | T | 00 | 00 |
| $d_{out}[32:35]\rightarrow$ | e | n | v | D |
| $d_{out}[36:39]\rightarrow$ | M | U | 00 | 00 |
| $d_{out}[40:43]\rightarrow$ | f | p | w | E |
| $d_{out}[44:47]\rightarrow$ | N | V | 00 | 00 |
| $d_{out}[48:51]\rightarrow$ | g | q | y | F |
| $d_{out}[52:55]\rightarrow$ | P | W | 00 | 00 |

*FIG. 5*

MEMORY ADDRESSING
FOR INPUT MATRIX A

MEMORY ADDRESSING
FOR OUTPUT MATRIX B (A)

| a | b | c | d | e | f | g | h |
|---|---|---|---|---|---|---|---|
| j | k | m | n | p | q | r | s |
| t | u | v | w | y | z | A | B |
| C | D | E | F | G | H | J | K |
| M | N | P | Q | R | S | T | U |
| V | W | Y | Z | A1 | A2 | A3 | A4 |

←——— INPUT OFFSET = 8 ———→

(B)

| a | j | t | C | M | V | 00 | 00 |
|---|---|---|---|---|---|----|----|
| b | k | u | D | N | W | 00 | 00 |
| c | m | v | E | P | Y | 00 | 00 |
| d | n | w | F | Q | Z | 00 | 00 |
| e | p | y | G | R | A1 | 00 | 00 |
| f | q | z | H | S | A2 | 00 | 00 |

←——— OUTPUT OFFSET = 8 ———→

(C)

| $d_{in}[0:3] \rightarrow$ | a | b | c | d |
|---|---|---|---|---|
| $d_{in}[4:7] \rightarrow$ | e | f | g | h |
| $d_{in}[8:11] \rightarrow$ | j | k | m | n |
| $d_{in}[12:15] \rightarrow$ | p | q | r | s |
| $d_{in}[16:19] \rightarrow$ | t | u | v | w |
| $d_{in}[20:23] \rightarrow$ | y | z | A | B |
| $d_{in}[24:27] \rightarrow$ | C | D | E | F |
| $d_{in}[28:31] \rightarrow$ | G | H | J | K |
| $d_{in}[32:35] \rightarrow$ | M | N | P | Q |
| $d_{in}[36:39] \rightarrow$ | R | S | T | U |
| $d_{in}[40:43] \rightarrow$ | V | W | Y | Z |
| $d_{in}[44:47] \rightarrow$ | A1 | A2 | A3 | A4 |

(D)

| $d_{out}[0:3] \rightarrow$ | a | j | t | c |
|---|---|---|---|---|
| $d_{out}[4:7] \rightarrow$ | M | V | 00 | 00 |
| $d_{out}[8:11] \rightarrow$ | b | k | u | D |
| $d_{out}[12:15] \rightarrow$ | N | W | 00 | 00 |
| $d_{out}[16:19] \rightarrow$ | c | m | v | E |
| $d_{out}[20:23] \rightarrow$ | P | Y | 00 | 00 |
| $d_{out}[24:27] \rightarrow$ | d | n | w | F |
| $d_{out}[28:31] \rightarrow$ | Q | Z | 00 | 00 |
| $d_{out}[32:35] \rightarrow$ | e | p | y | G |
| $d_{out}[36:39] \rightarrow$ | R | A1 | 00 | 00 |
| $d_{out}[40:43] \rightarrow$ | f | q | z | H |
| $d_{out}[44:47] \rightarrow$ | S | A2 | 00 | 00 |

*FIG. 6*

PARALLEL ARCHITECTURE FOR MATRIX TRANSPOSITION

TECHNICAL FIELD OF THE INVENTION

The technical field of this invention is matrix transposition.

BACKGROUND OF THE INVENTION

Matrix transposition is required in many algorithms in image and video processing. Several iMX hardware accelerators have been designed by Texas Instruments for use for parallel multiply-and-add operations. The most basic iMX can perform matrix transposition on only one data item at a time. Thus the matrix transposition operations performed using such hardware accelerators have low efficiency.

FIG. 1 illustrates a simplified diagram of a prior art iMX architecture including four multiply-and-accumulate (MAC) ALUs. Each logical memory block supporting iMX has the same number of banks as the number of processors. In this example there are four banks in input matrix memory 101 and four banks in output matrix memory 109. Each bank is 16-bits wide. The iMX accelerator addresses each bank individually so iMX can read/write any four consecutive 16-bit words starting from any word. For example, four consecutive words from a word address of '2' routes data from bank 2 to MAC_0 ALU, data from bank 3 to MAC_1 ALU, data from bank 0 to MAC_2 ALU and data from bank 1 to MAC_3 ALU. Input logic blocks 103 include input datapath 113 and input rotator 114. Output logic blocks 107 include output rotator 115 and output datapath 116. The iMX accelerator also uses multiple banks for parallel table lookup (not shown in FIG. 1). In that usage input rotator block 114 and output rotator block 115 are pass-through elements.

Input memory controller 110 computes required input addresses. These addresses are supplied to each of the input matrix memory banks 101 via corresponding address buffers 102.

Output memory controller 111 computes required output addresses. These addresses are supplied to each of the output matrix memory banks 109 via corresponding address buffers 108.

In earlier iMX accelerators, other than table reads, there is no provision to simultaneously read or write non-consecutive memory words. This limitation requires that matrix transposition be carried out one data item at a time.

FIG. 2 illustrates the sequence of operations for matrix transformation using the prior art iMX architecture illustrated in FIG. 1. The method of FIG. 2 is the only method possible with early iMX hardware. This sequence is very inefficient because only one MAC and one memory bank is used on each clock cycle. FIG. 2 illustrates successive reads of the input memory 201, 202, 203, and 204 one bank at a time. FIG. 2 also illustrates corresponding writes to the output memory 211, 212, 213, and 214 one bank at a time.

SUMMARY OF THE INVENTION

This invention incorporates techniques to accelerate the matrix transposition computations. Such matrix transpositions are required by algorithms used in image and video processing and generally implemented in MAC modules and memory banks. A more powerful memory controller allows computation of multiple memory addresses in the input and the output data paths. This makes possible new combinations of reads and writes at the input and output ports. Separating line width and offset parameters and clearly delineating data input/output quantities provides flexibility for trading memory use with computation efficiency. MACs and storage banks use is improved by applying combinations of bundling and spreading techniques in the write/read operations.

BRIEF DESCRIPTION OF THE DRAWINGS

These and other aspects of this invention are illustrated in the drawings, in which:

FIG. 2 illustrates successive read and write operations as performed by the prior art iMX architecture (Prior Art);

FIG. 4 illustrates an example of the bundled read and spread write (BRSW) method of this invention;

FIG. 5 illustrates another example of the spread read and bundled write (SRBW) method of this invention;

FIG. 6 illustrates a yet further example of the spread read and spread write (SRSW) method of this invention.

DETAILED DESCRIPTION OF PREFERRED EMBODIMENTS

The crucial unique concept of this invention is using multiple MAC modules and matching multiple memory banks as efficiently as possible during matrix transposition. This invention uses a new memory controller making it possible to access non-consecutive memory locations in multiple memory banks on a single read/write cycle. This new memory controller efficiently handles matrix transposition operations.

Figure 1:
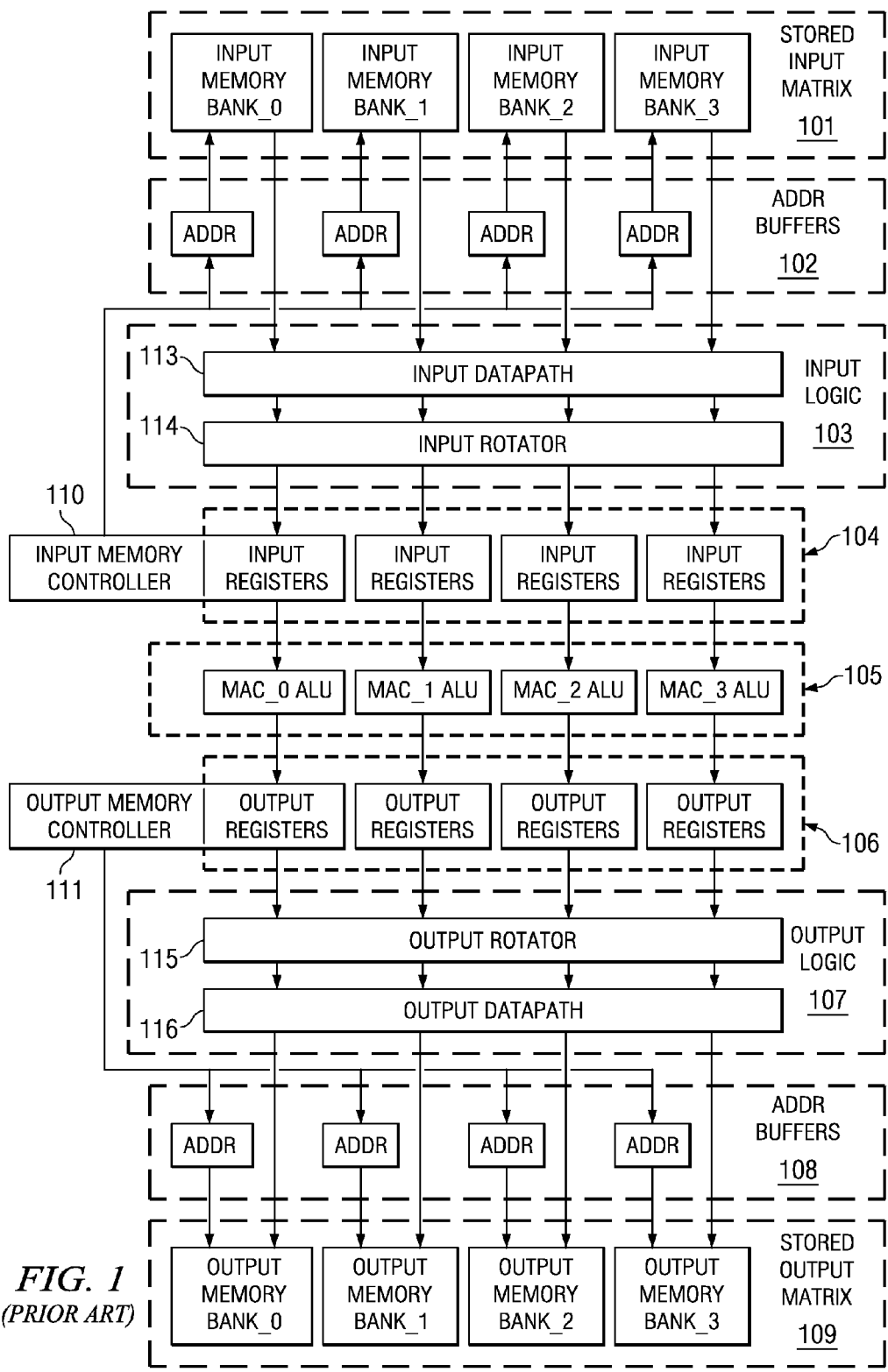
FIG. 1 illustrates a simplified block diagram of an example prior art iMX architecture using four MAC ALUs (Prior Art)
Figure 3:
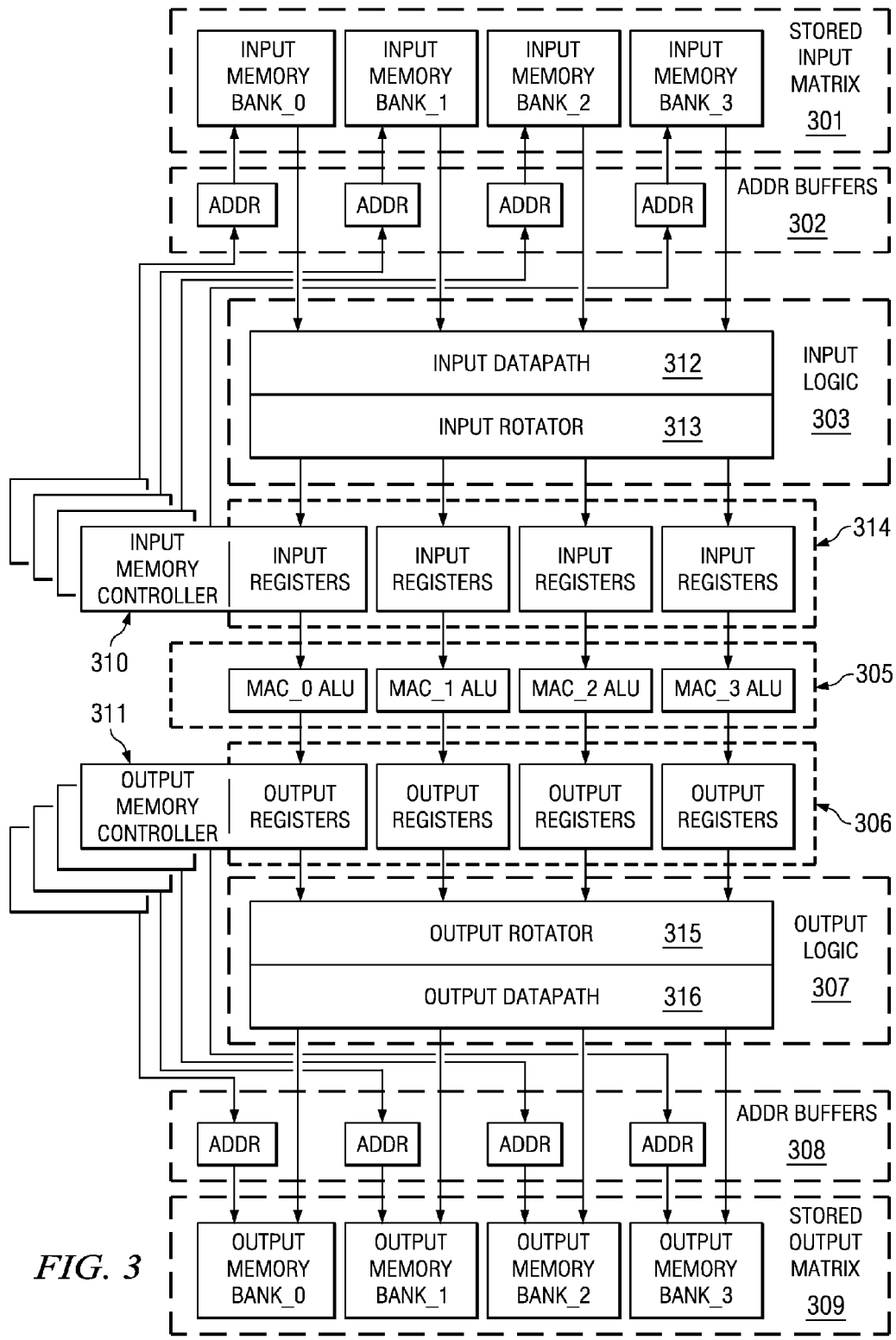
FIG. 3 illustrates a block diagram of an example iMX architecture of this invention using four MAC ALUs.

FIG. 3 illustrates a block diagram of the iMX architecture of this invention. This invention includes four MAC ALUs, a multiple bank input memory controller 310 and a multiple bank output memory controller 311. Input memory bank 301 and output memory bank 309 each have the same number of banks as the number of MACs. Input memory control 310 and output memory control 311 are each capable of computing memory addresses for the special read/write sequences to be described. Input logic blocks 303 include input datapath 312 and input rotator 313. Output logic blocks 307 include output rotator 315 and output datapath 316. The iMX accelerator may use multiple banks for parallel table lookup while input rotator 313 and output rotator 315 are simply pass-through elements.

Input memory control 310 and output memory control 311 compute all required addresses. These addresses are supplied to input memory banks 301 via corresponding address buffers 302 and to output memory banks 309 via corresponding address buffers 308.

Figure 7:
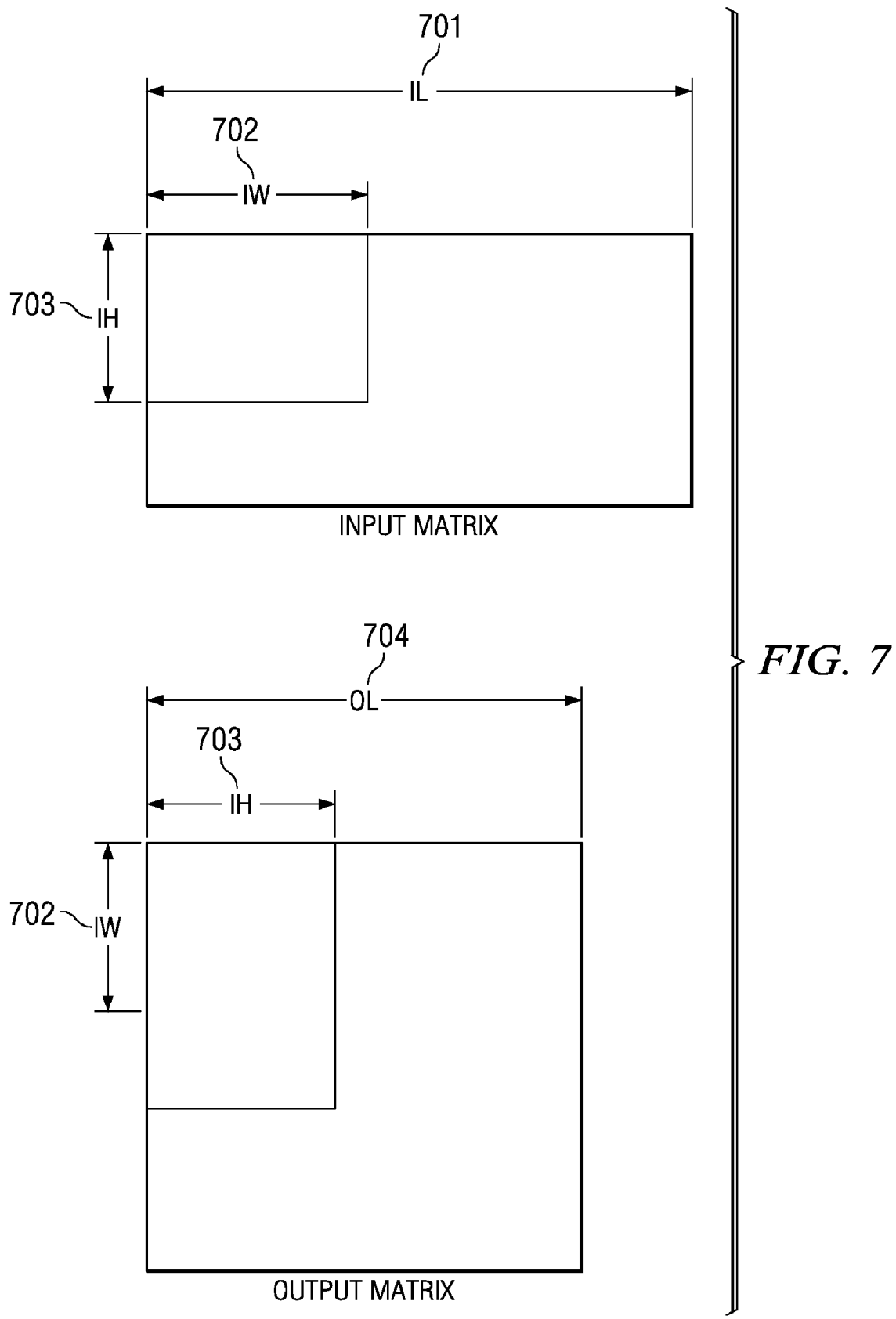
FIG. 7 illustrates the definition of the key variables employed in the computation procedures of this invention.

It is important to clearly define the variables to be used in order to explain the approach coherently. FIG. 7 illustrates these key variables. These are:

1. IL 701: Input matrix line offset. Input offset is the address difference between two rows of the input array.

2. IW 702: Input matrix width to process.

3. IH 703: Input matrix height to process.

4. OL 704: Output matrix line offset. Output offset is the address difference between two rows of the output array.

5. N: Number of MAC ALUs or memory banks in the iMX accelerator.

Note the input height equals the output width and input width equals the output height in matrix transposition.

Separating width from line offset enables the flexibility to trade memory storage cost for computation efficiency. To utilize MACs/banks as much as possible, the following strategies are applicable.

A Bundled Read and Spread Write (BRSW) operation reads input data sequentially and writes data spread-out. This is used when OL is relatively prime to N. Relatively prime in the notation of number theory means that the greatest common divider between the two numbers OL and N is 1; GCD (OL, N)=1.

A Spread Read and Bundled Write (SRBW) operation reads input data spread-out and writes data sequentially. This is used when IL is relatively prime to N; GCD(IL, N)=1.

A Spread Read and Spread Write (SRSW) operation reads input data spread-out and writes data spread-out. This is used when both (IL+1) and (OL+1) are relatively prime to N.

FIG. 4 illustrates one example of the bundled read and spread write (BRSW) method. FIG. 4A illustrates the input matrix A to be transposed. FIG. 4B illustrates the desired output matrix B after the transposition. Empty matrix locations are denoted by OO. Corresponding input memory address and content din[_:_] for matrix A are illustrated in FIG. 4c. Corresponding output memory address and content dout[_:_] for matrix B are illustrated in FIG. 4D.

At a first step, the iMX accelerator reads four data entries (a, b, c, d) from input memory matrix A illustrated in FIG. 4A. FIG. 4C illustrates these are the first four bundled entries in row 1: din[0], din[1], din[2] and din[3]. Input memory control 310 generates the required sequential addresses. This data is written into the output memory of FIG. 4D in spread locations dout[0], dout[7], dout[14] and dout[21] at addresses generated by output memory control 311. This uses all four MAC modules. Note that each column in FIG. 4C represents an input memory bank and that each column in FIG. 4D represents an output memory bank. Each of the four reads are from one input memory bank and each of the four writes are to one output memory bank. In this invention any read/write cycle encounters no conflicts from having more than one read or write from any memory bank.

At a second step, the iMX accelerator reads the next four bundled data entries (e, f, g, h) from input memory matrix A illustrates FIG. 4A. These are the next four sequential entries in row 1: din[4], din[5], din[6] and din[7]. Input memory control 310 generates the required sequential addresses. This data is written into the output memory of FIG. 4D in spread locations dout[28], dout[35], dout[42] and dout[49] at addresses generated by output memory control 311. The important point is that no data are read from same memory bank and no data are written to same memory bank.

Table 1 shows the progression of BRSW code index values leading to the generation of addresses for the memory read/write transfers. Each read/write transfer is bracketed according to the four bundled read and four spread write addresses involved. Table 1 also shows that only 12 read/write steps are required to transpose a 6×8 matrix. The original method required four times as many or 48 steps. Each block of Table 1 contains the information regarding the reads/writes accomplished on a single cycle.

TABLE 1

BRSW Code Check
IH = 6, IW = 8, IL = 8, OL = 7, N = 4

| i | j | p | addr [out] | addr [in] |
|---|---|---|---|---|
| 0 | 0 | 0 | 0 | 0 |
| 0 | 0 | 1 | 7 | 1 |
| 0 | 0 | 2 | 14 | 2 |
| 0 | 0 | 3 | 21 | 3 |
| 0 | 4 | 0 | 28 | 4 |
| 0 | 4 | 1 | 35 | 5 |
| 0 | 4 | 2 | 42 | 6 |
| 0 | 4 | 3 | 49 | 7 |
| 1 | 0 | 0 | 1 | 8 |
| 1 | 0 | 1 | 8 | 9 |
| 1 | 0 | 2 | 15 | 10 |
| 1 | 0 | 3 | 22 | 11 |
| 1 | 4 | 0 | 29 | 12 |
| 1 | 4 | 1 | 36 | 13 |
| 1 | 4 | 2 | 43 | 14 |
| 1 | 4 | 3 | 50 | 15 |
| 2 | 0 | 0 | 2 | 16 |
| 2 | 0 | 1 | 9 | 17 |
| 2 | 0 | 2 | 16 | 18 |
| 2 | 0 | 3 | 23 | 19 |
| 2 | 4 | 0 | 30 | 20 |
| 2 | 4 | 1 | 37 | 21 |
| 2 | 4 | 2 | 44 | 22 |
| 2 | 4 | 3 | 51 | 23 |
| 3 | 0 | 0 | 3 | 24 |
| 3 | 0 | 1 | 10 | 25 |
| 3 | 0 | 2 | 17 | 26 |
| 3 | 0 | 3 | 24 | 27 |
| 3 | 4 | 0 | 31 | 28 |
| 3 | 4 | 1 | 38 | 29 |
| 3 | 4 | 2 | 45 | 30 |
| 3 | 4 | 3 | 52 | 31 |
| 4 | 0 | 0 | 4 | 32 |
| 4 | 0 | 1 | 11 | 33 |
| 4 | 0 | 2 | 18 | 34 |
| 4 | 0 | 3 | 25 | 35 |
| 4 | 4 | 0 | 32 | 36 |
| 4 | 4 | 1 | 39 | 37 |
| 4 | 4 | 2 | 46 | 38 |
| 4 | 4 | 3 | 53 | 39 |
| 5 | 0 | 0 | 5 | 40 |
| 5 | 0 | 1 | 12 | 41 |
| 5 | 0 | 2 | 19 | 42 |
| 5 | 0 | 3 | 26 | 43 |
| 5 | 4 | 0 | 33 | 44 |
| 5 | 4 | 1 | 40 | 45 |
| 5 | 4 | 2 | 47 | 46 |
| 5 | 4 | 3 | 54 | 47 |

Pseudo code for BRSW is as follows:

[Trans_Bundle_Read_Spread_Write]

```
for (i=0; i<IH; i++)
    for (j=0; j<IW; j+=N)
        for (p=0; p<N; p++) /* loop running in parallel by MACS*/
            if (j+p < iW)
                dout[(j+p)*OL + i] = din[i*IL + j + p]
```

For the BRSW method to work there must be no memory contention in reads and in writes. Since reads are consecutive, reading N items out of N banks of memory will not have contention. Writes are spread-out. Each ALU p, for p=0 . . . N−1 is writing to bank(p), thus:

$$bank(p) = ((j + p) * OL + i) \bmod N$$
$$= (p * OL + i) \bmod N$$

Note that j was removed in the procedure because j is a multiple of N. It is important that no two ALUs pass data to the same memory bank. Otherwise memory bank contention occurs and the transposition slows down. In order to meet the collision-free criterion:

$$bank(p) != bank(q) \text{ for any } p != q,$$

we must have:

$$GCD(OL, N)=1,$$

where: GCD denotes the greatest common denominator.

Suppose GCD(OL, N)=d>1. Since the banks are (OL mod N) apart and therefore multiples of d apart, contentions will occur among the ALUs. For example, when N=8 and d=2, there are 2-way contentions: the 8 ALUs go to banks {0, 2, 4, 6} or {1, 3, 5, 7}, depending on i. When N=8 and d=4, there are 4-way contentions: the 8 ALUs go to banks {0, 4}, {1, 5}, {2, 6}, {3, 7}, depending on i.

FIG. 5 illustrates one example of the spread read and bundled write (SRBW) method. FIG. 5A illustrates input matrix A to be transposed. FIG. 5B illustrates the desired output matrix B after the transposition. Corresponding input memory address and content din[_:_] for matrix A are illustrated in FIG. 5C and output memory address and content dout[_:_] for matrix B illustrates in FIG. 5D. Empty matrix locations are denoted by OO.

At a first step, iMX reads four data entries (a, h, r, z) from the input memory matrix A of FIG. 5A from spread locations [0], [7], [14], and [21] illustrates in FIG. 5C in one read operation and writes them in one write operation into the output memory matrix of FIG. 5D in bundled locations [0], [1], [2], and [3] to sequential locations in the first row of the output memory in FIG. 5D.

At second step, iMX reads only the next two data entries (G, Q) from the input memory matrix A of FIG. 5A stored in locations [28] and [35] in FIG. 5C. The iMX writes two data elements into the output memory matrix of FIGS. 5D at locations [4] and [5] in banks 0 and 1 of the output memory array. Locations [6] and [7] remain empty in FIG. 5D. The need to reduce to two reads/writes in the second step results from reaching the end of a column in the input matrix. The important point is that no data are read from same memory bank and no data are written to same memory bank in this single step.

Table 2 shows the progression of BRSW code index values leading to the generation of addresses for the memory read/write transfers. Each read/write transfer is bracketed according to the two or four bundled read and the spread write addresses involved. Table 2 also illustrates that only 14 steps are required to transpose the 6×7 matrix. This which would require 42 steps with the original sequential method. Each block of Table 2 contains the information regarding the reads/writes accomplished on a single cycle. Because of the combinations of input and output matrix sizes chosen for the example, some cycles accomplish only two reads/writes.

TABLE 2

SRBW Code Check
IH = 6, IW = 7, IL = 7, OL = 8, N = 4

| i | j | p | addr [out] | addr [in] |
|---|---|---|---|---|
| 0 | 0 | 0 | 0 | 0 |
| 0 | 0 | 1 | 1 | 7 |
| 0 | 0 | 2 | 2 | 14 |
| 0 | 0 | 3 | 3 | 21 |
| 4 | 0 | 0 | 4 | 28 |
| 4 | 0 | 1 | 5 | 35 |
| 0 | 1 | 0 | 8 | 1 |
| 0 | 1 | 1 | 9 | 8 |
| 0 | 1 | 2 | 10 | 15 |
| 0 | 1 | 3 | 11 | 22 |
| 4 | 1 | 0 | 12 | 29 |
| 4 | 1 | 1 | 13 | 36 |
| 0 | 2 | 0 | 16 | 2 |
| 0 | 2 | 1 | 17 | 9 |
| 0 | 2 | 2 | 18 | 16 |
| 0 | 2 | 3 | 19 | 23 |
| 4 | 2 | 0 | 20 | 30 |
| 4 | 2 | 1 | 21 | 37 |
| 0 | 3 | 0 | 24 | 3 |
| 0 | 3 | 1 | 25 | 10 |
| 0 | 3 | 2 | 26 | 17 |
| 0 | 3 | 3 | 27 | 24 |
| 4 | 3 | 0 | 28 | 31 |
| 4 | 3 | 1 | 29 | 38 |
| 0 | 4 | 0 | 32 | 4 |
| 0 | 4 | 1 | 33 | 11 |
| 0 | 4 | 2 | 34 | 18 |
| 0 | 4 | 3 | 35 | 25 |
| 4 | 4 | 0 | 36 | 32 |
| 4 | 4 | 1 | 37 | 39 |
| 0 | 5 | 0 | 40 | 5 |
| 0 | 5 | 1 | 41 | 12 |
| 0 | 5 | 2 | 42 | 19 |
| 0 | 5 | 3 | 43 | 26 |
| 4 | 5 | 0 | 44 | 33 |
| 4 | 5 | 1 | 45 | 40 |
| 0 | 6 | 0 | 48 | 6 |
| 0 | 6 | 1 | 49 | 13 |
| 0 | 6 | 2 | 50 | 20 |
| 0 | 6 | 3 | 51 | 27 |
| 4 | 6 | 0 | 52 | 34 |
| 4 | 6 | 1 | 53 | 41 |

Pseudo code for SRBW is as follows:

```
[Trans_Spread_Read_Bundle_Write]
for (j=0; j<IW j++)
  for (l=0 i<IH; i+=N)
    for (p=0; p<N; p++) / loop is in parallel with MACs */
      if (i+p < IH)
        dout[j*OL + i + p] = din[(i + p)*IL +j];
```

For the SRBW method to work, the spread-out reads must not have memory contention. In order for $$bank(p) = ((i + p) * IL + j) \bmod N$$
$$= (p * IL + j) \bmod N$$

to avoid one another, for p=0 . . . N−1, then GCD(IL, N)=1.

FIG. 6 illustrates one example of the spread read and spread write (SRSW) method. FIG. 6A illustrates the input matrix A to be transposed. FIG. 6B illustrates the desired output matrix B after transposition. Corresponding input memory address and content din[_:_] for matrix A are illustrated in FIG. 6C. Corresponding output memory address and content dout[_:_] for matrix B are illustrated in FIG. 6D.

At the first step, the iMX accelerator reads four data entries (a, k, v, F) from the input memory matrix A illustrated in FIG. 6A. FIG. 6C illustrates these are from spread input memory locations din[0], din[9], din[18] and din[27]. This data is written into the output memory of FIGS. 6D in spread locations dout[0], dout[9], dout[18] and dout[27] at addresses generated by output memory control 311.

At the second step, the iMX accelerator reads the next four data entries (b, m, w, and C) from the input memory matrix A illustrated FIG. 6C from spread memory locations din[1], din[10], din[19] and din[24]. Input memory control 310 generates the required addresses. This data is written into the output memory matrix of FIGS. 6D in spread locations dout[8], dout[17], dout[26] and dout[3] in the output memory illustrated in FIG. 6D at addresses generated by output memory control 311.

Table 3 shows the progression of SRSW code index values leading to the generation of addresses for the memory read/write transfers. Each read/write transfer is bracketed according to the two or four bundled read and spread write addresses involved. Table 2 also illustrates that only 14 steps are required to transpose the 6×7 matrix. The original method required 42 steps.

TABLE 3

SRSW Code Check IH = 6, IW = 6, IL = 8, OL = 8, N = 4

| i | j | k | p | (k + p) % N | addr [out] | addr [in] |
|---|---|---|---|---|---|---|
| 0 | 0 | 0 | 0 | 0 | 0 | 0 |
| 0 | 0 | 0 | 1 | 1 | 9 | 9 |
| 0 | 0 | 0 | 2 | 2 | 18 | 18 |
| 0 | 0 | 0 | 3 | 3 | 27 | 27 |
| 0 | 0 | 1 | 0 | 1 | 8 | 1 |
| 0 | 0 | 1 | 1 | 2 | 17 | 10 |
| 0 | 0 | 1 | 2 | 3 | 26 | 19 |
| 0 | 0 | 1 | 3 | 0 | 3 | 28 |
| 0 | 0 | 2 | 0 | 2 | 16 | 2 |
| 0 | 0 | 2 | 1 | 3 | 25 | 11 |
| 0 | 0 | 2 | 2 | 0 | 2 | 16 |
| 0 | 0 | 2 | 3 | 1 | 11 | 25 |
| 0 | 0 | 3 | 0 | 3 | 24 | 3 |
| 0 | 0 | 3 | 1 | 0 | 1 | 8 |
| 0 | 0 | 3 | 2 | 1 | 10 | 17 |
| 0 | 0 | 3 | 3 | 2 | 19 | 26 |
| 0 | 4 | 0 | 0 | 0 | 32 | 4 |
| 0 | 4 | 0 | 1 | 1 | 41 | 13 |
| 0 | 4 | 1 | 0 | 1 | 40 | 5 |
| 0 | 4 | 1 | 3 | 0 | 35 | 28 |
| 0 | 4 | 2 | 2 | 0 | 34 | 20 |
| 0 | 4 | 2 | 3 | 1 | 43 | 29 |
| 0 | 4 | 3 | 1 | 0 | 33 | 12 |
| 0 | 4 | 3 | 2 | 1 | 42 | 21 |
| 4 | 0 | 0 | 0 | 0 | 4 | 32 |
| 4 | 0 | 0 | 1 | 1 | 13 | 41 |
| 4 | 0 | 1 | 0 | 1 | 12 | 33 |
| 4 | 0 | 1 | 1 | 2 | 21 | 42 |
| 4 | 0 | 2 | 0 | 2 | 20 | 34 |
| 4 | 0 | 2 | 1 | 3 | 29 | 43 |
| 4 | 0 | 3 | 0 | 3 | 28 | 35 |
| 4 | 0 | 3 | 1 | 0 | 5 | 40 |
| 4 | 4 | 0 | 0 | 0 | 36 | 36 |
| 4 | 4 | 0 | 1 | 1 | 45 | 45 |
| 4 | 4 | 1 | 0 | 1 | 44 | 37 |
| 4 | 4 | 3 | 1 | 0 | 37 | 44 |

Pseudo code for SRSW is as follows:

[Trans_Spread_Read_Spread_Write]

```
for (i=0; i<IH; i+=N)
  for (j=0; j<IW j+=N)
    for (k=0; k<N; k++)
      for (p=0; p<N; p++) /* loop is done in parallel by
                              MACs */
        if ((i+p < IH) && (j+((k+p)%N) < IW))
          dout[(j+÷((k+P)%N))*OL + i + p)
            = din[(I+p)*IL + j + (k+p)%N];
Note that % denotes the modulo operator, as in C
programming language.
```

For the SRSW method to work, memory contention on reads and on writes must be avoided. Note that i and j are multiples of N and that k is a constant in any single step.

$$rbank(p) = (i + p) * IL + j + ((k + p) \% N) \bmod N$$
$$= (p * IL + k + p) \bmod N$$
$$= (k + (IL + 1) * p) \bmod N$$

$$wbank(p) = ((j + (k + p) \% N) * OL + i + p \bmod N$$
$$= ((k + p) * OL + p) \bmod N$$
$$= (k * OL + (OL + 1) * p) \bmod N$$

The k term in rbank(p) and k*OL term in wbank(p) are constants for the memory bank exclusivity checking.

Thus, two conditions must be met:

$$GCD(IL+1, N)=1 \text{ and } GCD(OL+1, N)=1.$$

In a parallel architecture of N processors and N memory banks, we usually restrict N to a power of 2 to simplify address calculation. Suppose N is a power of 2. When OL is odd, GCD(OL, N)=1 and the BRSW method can be used to speed up transposition. When IL is odd, GCD(IL, N)=1 and the SRBW method can be used. When both fail, we have OL and IL both even, thus both OL+1 and IL+1 must be odd. Accordingly, GCD(IL+1, N)=GCD(OL+1, N)=1, and the SRSW method can be used.

The pseudo codes are simple and straightforward to implement with hardware. Existing iMX architecture already has the input/output rotation blocks to route the read/write data. All that is additionally needed is to perform the separate address calculations. These are mere extensions proceeding from addressing the entire memory to addressing individual memory banks.

What is claimed is:
1. A matrix transposition accelerator comprising:
   a plurality of N input memory banks;
   a plurality of N input address registers, each input address register corresponding to one of said input memory banks;
   a plurality of N multiply and add units, each multiply and add unit corresponding to one of said input memory banks;
   a plurality of N output memory banks, each output memory bank corresponding to one of said multiply and add units;
   a plurality of N output address registers, each output address unit corresponding to one of said output memory banks' an input memory controller connected to said plurality of input address registers; and an output memory controller connected to said plurality of output address registers;

said matrix transformation accelerator operating said input memory controller in cooperation with said output memory controller whereby said input memory controller supplies addresses to corresponding input address registers for recalling plural matrix elements from plural separate input memory banks and said output memory controller supplies addresses to corresponding output address register writing plural matrix elements into corresponding locations plural separate output memory banks.

2. The matrix transposition accelerator of claim 1 wherein:

said input memory controller operates to supply said addresses to said input address registers for recalling plural matrix elements from sequential memory locations within plural input memory banks; and said output memory controller operates to supply said addresses to said output address registers to write plural matrix elements to scattered memory locations in plural output memory banks.

3. The matrix transposition accelerator of claim 2, wherein:

said input memory controller and said output memory controller operate cooperatively according to the code sequence:

```
for (i=0; i<IH; i++)
    for (j=0; j<IW; j+=N)
        for (p=0; p<N; p++)
            if (j+p < iW)
                then dout[(j+p)*OL + I] and din[i*IL + j + p]
``` where: IH is an input matrix height; IW is an input matrix width; i, j and p are index variables; and the greatest common denominator between and output matrix offset OL and N is 1.

4. The matrix transposition accelerator of claim 1 wherein:

said input memory controller operates to supply said addresses to said input address registers for recalling plural matrix elements from scattered memory locations within plural input memory banks; and said output memory controller operates to supply said addresses to said output address registers to write plural matrix elements to sequential memory locations in plural output memory banks.

5. The matrix transposition accelerator of claim 4, wherein:

said input memory controller and said output memory controller operate cooperatively according to the code sequence:

```
for (j=0; j<IW j++),
    for (i=0 i<IH; i+=N),
        for (p=0; p<N; p++),
            if (i+p < IH)
                then dout{j*OL + i + p] and din[(i + p)*IL + j]
``` where: IH is an input matrix height; IW is an input matrix width; j, i and p are index variables; and the greatest common denominator between an input matrix offset IL and N is 1.

6. The matrix transposition accelerator of claim 1 wherein:

said input memory controller operates to supply said addresses to said input address registers for recalling plural matrix elements from scattered memory locations within plural input memory banks; and said output memory controller operates to supply said addresses to said output address registers to write plural matrix elements to scattered memory locations in plural output memory banks.

7. The matrix transposition accelerator of claim 6, wherein:

said input memory controller and said output memory controller operate cooperatively according to the code sequence:

```
for (i=0; i<IH; i+=N),
    for (j=0; j<IW j+=N),
        for (k=0; k<N; k++)
            for (p=0; p<N; p++)
                if ((i+p) < IH) AND (j+((k+p)%N) < IW))
                    then dout{(j+((k+p)%N))*OL + i + p) and
                        din[(i+p)*IL + j + (k+p)%N],
``` where: IH is an input matrix height; IW is an input matrix width; i, j, k and p are index variables; (X) % N is X modulo N; and the greatest common denominator between the sum of an input offset IL and 1 (IL+1), and N is 1 and the greatest common denominator between the sum of an output offset OL and 1 (OL+1), and N is 1.

* * * * *